United States Patent
Miller

(10) Patent No.: US 7,614,151 B2
(45) Date of Patent: Nov. 10, 2009

(54) METHOD OF SECURING A BRACKET TO A FRAME ASSEMBLY

(75) Inventor: Michael F. Miller, Portage, MI (US)

(73) Assignee: Dana Automotive Systems Group, Inc., Toledo, OH (US)

( * ) Notice: Subject to any disclaimer, the term of this patent is extended or adjusted under 35 U.S.C. 154(b) by 924 days.

(21) Appl. No.: 11/156,175

(22) Filed: Jun. 17, 2005

(65) Prior Publication Data

US 2005/0278924 A1    Dec. 22, 2005

Related U.S. Application Data

(60) Provisional application No. 60/580,491, filed on Jun. 17, 2004.

(51) Int. Cl.
- B21D 53/88 (2006.01)
- B23P 17/00 (2006.01)
- B21D 51/00 (2006.01)

(52) U.S. Cl. .................. 29/897.2; 29/416; 29/421.1; 29/463; 72/61; 248/674

(58) Field of Classification Search ............ 29/897.2, 29/419.2, 421.1, 412, 416, 425, 445, 463, 29/525.14; 72/54, 55, 56, 61; 403/274, 277; 248/674, 536, 207, 219.3

See application file for complete search history.

(56) References Cited

U.S. PATENT DOCUMENTS

| | | | |
|---|---|---|---|
| 1,992,710 A | 2/1935 | Matthaei | |
| 2,009,963 A | 7/1935 | Matthaei | |
| 2,113,403 A | 4/1938 | Harmon | |
| 2,192,560 A | 3/1940 | Riemenschneider | |
| 2,228,740 A | 1/1941 | Wagner et al. | |
| 3,520,049 A | 7/1970 | Lysenko et al. | |
| 5,333,775 A | 8/1994 | Bruggemann et al. | |
| 5,442,846 A * | 8/1995 | Snaper | 29/419.2 |
| 5,966,813 A * | 10/1999 | Durand | 29/897.2 |
| 6,138,358 A * | 10/2000 | Marando | 29/897.2 |
| 6,519,855 B1 * | 2/2003 | Marando | 29/897.2 |
| 6,654,995 B1 * | 12/2003 | Wang et al. | 29/421.1 |
| 6,764,559 B2 * | 7/2004 | Li et al. | 148/523 |
| 6,769,178 B1 * | 8/2004 | Beckman | 29/897.2 |
| 6,941,786 B1 * | 9/2005 | Cooper et al. | 72/58 |
| 6,978,545 B2 * | 12/2005 | Marando | 29/897.2 |
| 7,127,816 B2 * | 10/2006 | Kiehl | 29/897.2 |

FOREIGN PATENT DOCUMENTS

WO    WO 9700595 A1 *    1/1997

* cited by examiner

*Primary Examiner*—Jermie E Cozart
(74) *Attorney, Agent, or Firm*—Marshall & Melhorn, LLC

(57) ABSTRACT

A frame assembly is manufacturing by initially providing first and second brackets. The brackets are provided by initially providing a closed channel structural member and deforming the closed channel structural member, such as by hydroforming, to have a central body portion having a pair of arm portions extending therefrom. The central portion is then divided, such as by cutting, to provide first and second brackets, each including one of the arm portions. A frame assembly is provided including a component having first and second openings formed therethrough. The arm portions of the first and second brackets are disposed respectively in the first and second openings and secured thereto by magnetic pulse welding.

10 Claims, 12 Drawing Sheets

METHOD OF SECURING A BRACKET TO A FRAME ASSEMBLY

CROSS-REFERENCE TO RELATED APPLICATIONS

This application claims the benefit of U.S. Provisional Application No. 60/580,491, filed Jun. 17, 2004, the disclosure of which is incorporated herein by reference.

BACKGROUND OF THE INVENTION

This invention relates in general to methods for manufacturing frame assemblies, such as are commonly found in vehicles. In particular, this invention relates to an improved method for manufacturing a bracket, such as a body mount support bracket, using hydroforming techniques and for securing such bracket to a vehicular frame assembly using magnetic pulse welding techniques.

Many land vehicles in common use, such as automobiles, vans, and trucks, include a body and frame assembly that is supported upon a plurality of ground-engaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

In a typical separate type of vehicle body and frame assembly, the frame portion has a plurality of body mount support brackets secured thereto. The body mount support brackets are provided to facilitate the connection of the body portion of the vehicle body and frame assembly to the frame portion. Typically, each of the body mount support brackets is formed having a generally inverted U-shaped configuration including a central body portion having a pair of leg portions depending therefrom. An opening is formed through the central body portion of each of the body mount support brackets to facilitate the connection of the body portion of the vehicle body and frame assembly to the frame portion. The body mount support brackets are usually secured to the frame portion of the vehicle body and frame assembly by conventional welding techniques. Although this method of manufacturing a vehicle body and frame assembly has been effective, some drawbacks have been noted. Thus, it would be desirable to provide an improved method of manufacturing a frame assembly, such as is commonly found in a vehicle, that addresses these drawbacks.

SUMMARY OF THE INVENTION

This invention relates to an improved method for manufacturing a bracket, such as a body mount support bracket, using hydroforming techniques and for securing such bracket to a frame assembly, such as is commonly found in a vehicle, using magnetic pulse welding techniques. Initially, a tubular member is deformed, such as by hydroforming, to have a central portion having a predetermined shape, such as a generally box-shaped configuration, having a pair of arm portions extending outwardly therefrom. The central portion is then divided so as to provide two individual body mount support brackets, each including a portion of the central portion and one of the arm portions. The arm portion of one of the body mount support bracket can be inserted through an opening formed through a closed channel structural member, such as a side rail of a ladder type frame assembly. Then, the arm portion of the body mount support bracket is secured to the side rail, such as by using electromagnetic pulse welding techniques. The same process can be used to secure other body mount support brackets to other portions of the frame assembly. Lastly, the body portion and other components of the vehicle or other structure can be mounted on the body mount support brackets to form a body and frame assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
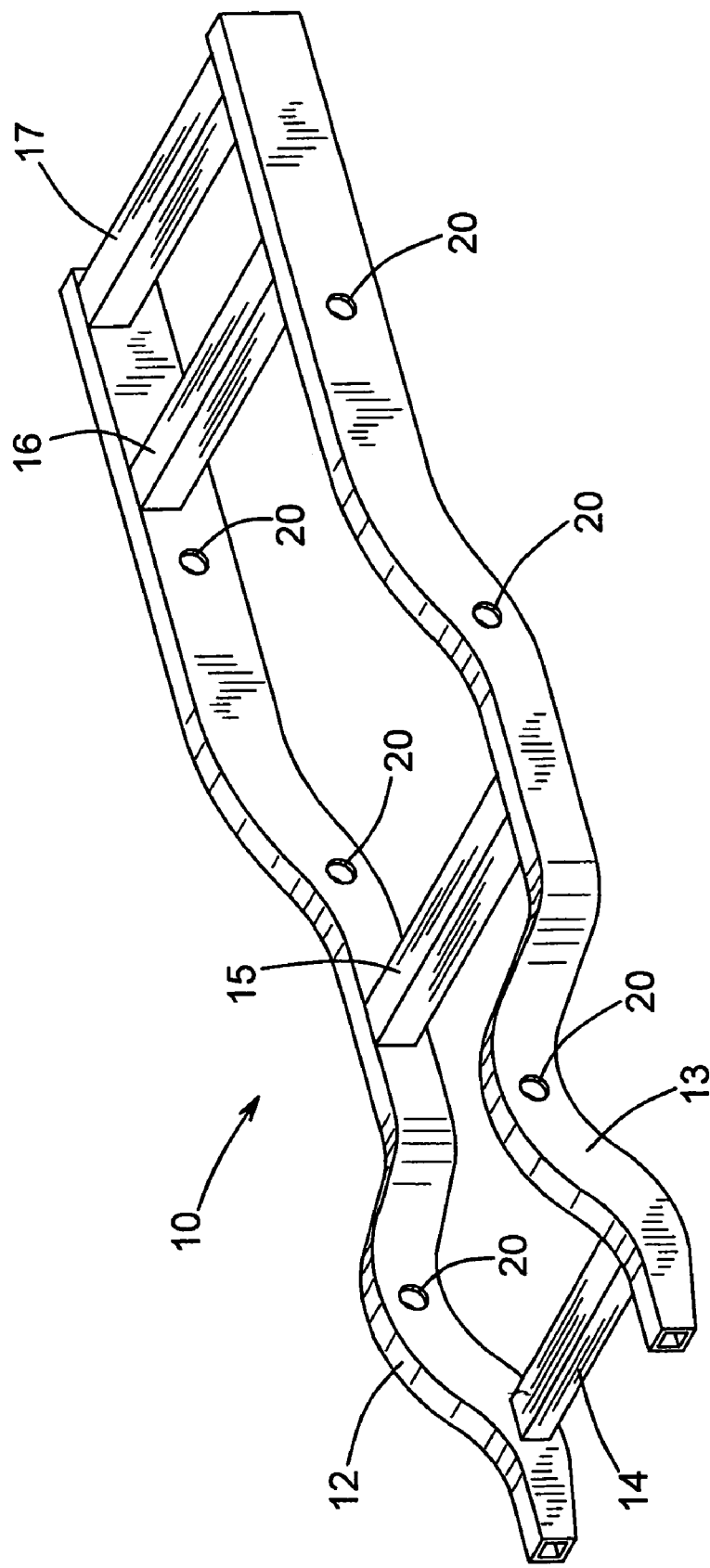
FIG. 1 is a perspective view of a conventional ladder type frame assembly, such as is commonly found in a vehicle.

Referring now to the drawings, there is illustrated in FIG. 1 a frame assembly, indicated generally at 10, in accordance with this invention. The illustrated frame assembly 10 may, for example, be used in a conventional vehicle, although such is not required. The illustrated frame assembly 10 is, in large measure, conventional in the art and is intended merely to illustrate one environment in which this invention may be used. Thus, the scope of this invention is not intended to be limited for use with the specific structure for the frame assembly 10 illustrated in FIG. 1 or with frame assemblies in general. On the contrary, as will become apparent below, this invention may be used in any desired environment for the purposes described below.

The illustrated frame assembly 10 is a ladder type frame assembly that includes including a pair of longitudinally extending side rails 12 and 13 having a plurality of cross members 14, 15, 16, and 17 extending transversely therebetween. The illustrated side rails 12 and 13 extend longitudinally throughout the entire length of the frame portion 10 and are generally parallel to one another, although such is not required. Both the side rails 12 and 13 may be formed from any suitable material or combination of materials having any suitable cross sectional shape. For example, the side rails 12 and 13 in the illustrated embodiment are formed from closed channel structural members. However, one or both of the side rails 12 and 13 may be formed using multiple open channel structural members joined to form a closed channel member or from a plurality of individually formed closed channel structural members that are secured together by any conventional means, such as by welding, riveting, bolting, and the like. Furthermore, portions of the side rails 12 and 13 may be formed from open channel structural members.

The illustrated cross members 14 through 17 extend generally perpendicular to the side rails 12 and 13 and may be formed having any conventional structure. The cross members 14 through 17 are spaced apart from one another along the length of the frame portion 10 and can be secured to the side rails 12 and 13 by any conventional means, such as by welding, riveting, bolting, and the like. When secured to the side rails 12 and 13, the cross members 14 through 17 provide lateral and torsional rigidity to the frame assembly 10.

A plurality of mounting holes, indicated generally at 20, are provided on the frame assembly 10. The mounting holes 20 may be used to attach auxiliary structures to the frame assembly 10, such as a plurality of body mount support bracket of this invention, as will be explained in detail below. The body mount support brackets are provided to facilitate the connection of a body portion (not shown) and other various components (not shown) to the frame assembly 10 and will be described in greater detail below. The mounting holes 20 may be of any suitable shape to accommodate the body mount support brackets. In the preferred embodiment, the mounting holes 20 are generally annular in shape. The mounting holes 20 may also include a flanged portion, not shown, for receiving the body mount support brackets, although such is not required.

Figure 2:
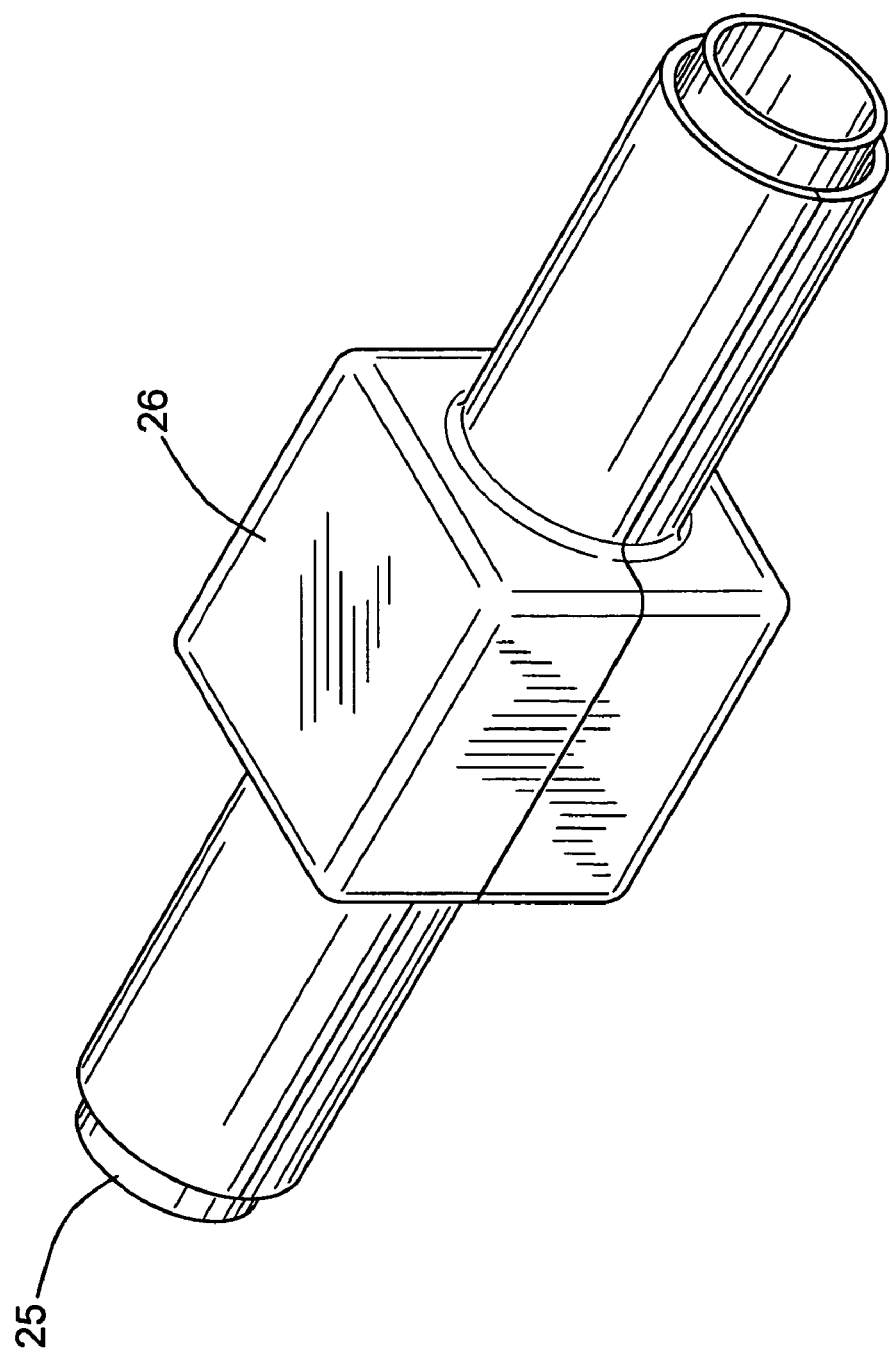
FIG. 2 is a perspective view of a tubular blank inserted into a forming die.
Figure 3:
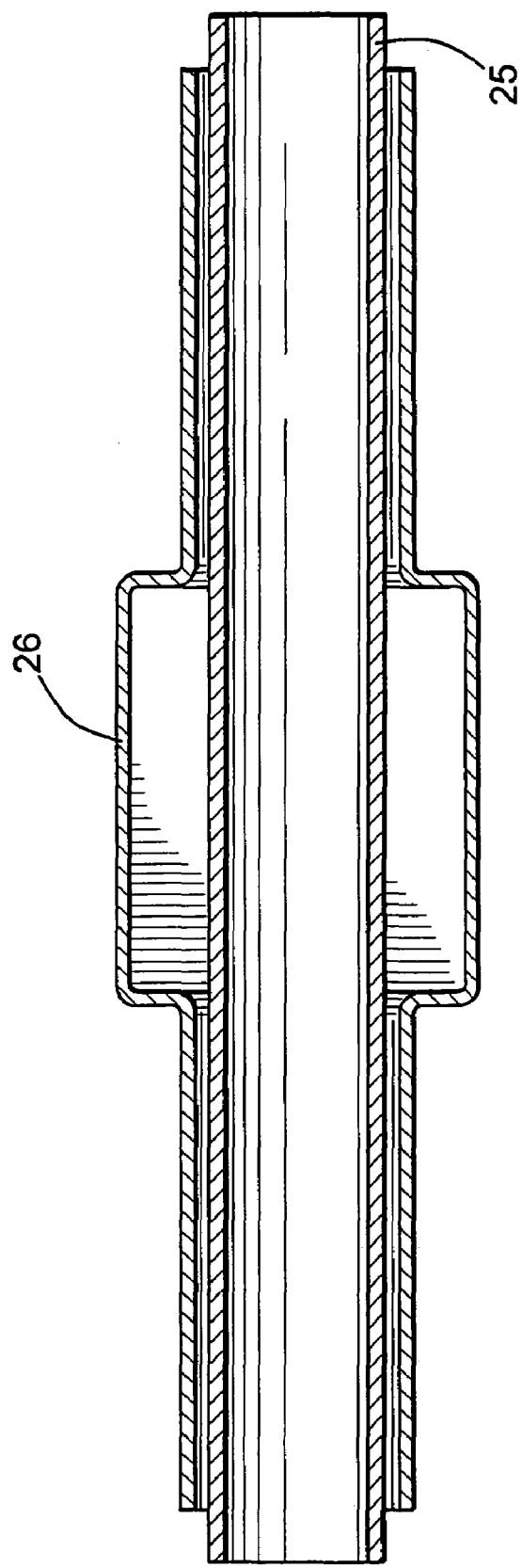
FIG. 3 is a sectional elevational view of the tubular blank and the forming die illustrated in FIG. 2 shown prior to the forming operation.
Figure 4:
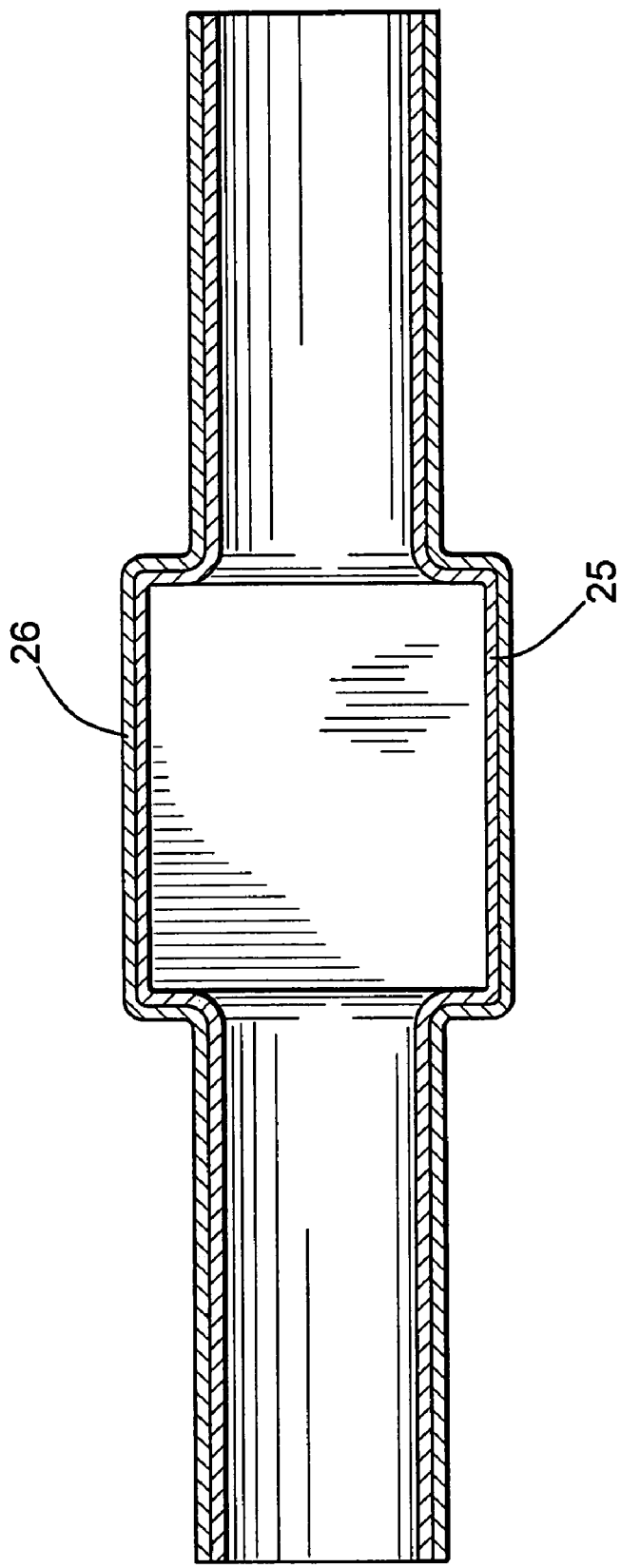
FIG. 4 is a sectional elevational view of the tubular blank and the forming die after the forming operation.
Figure 5:
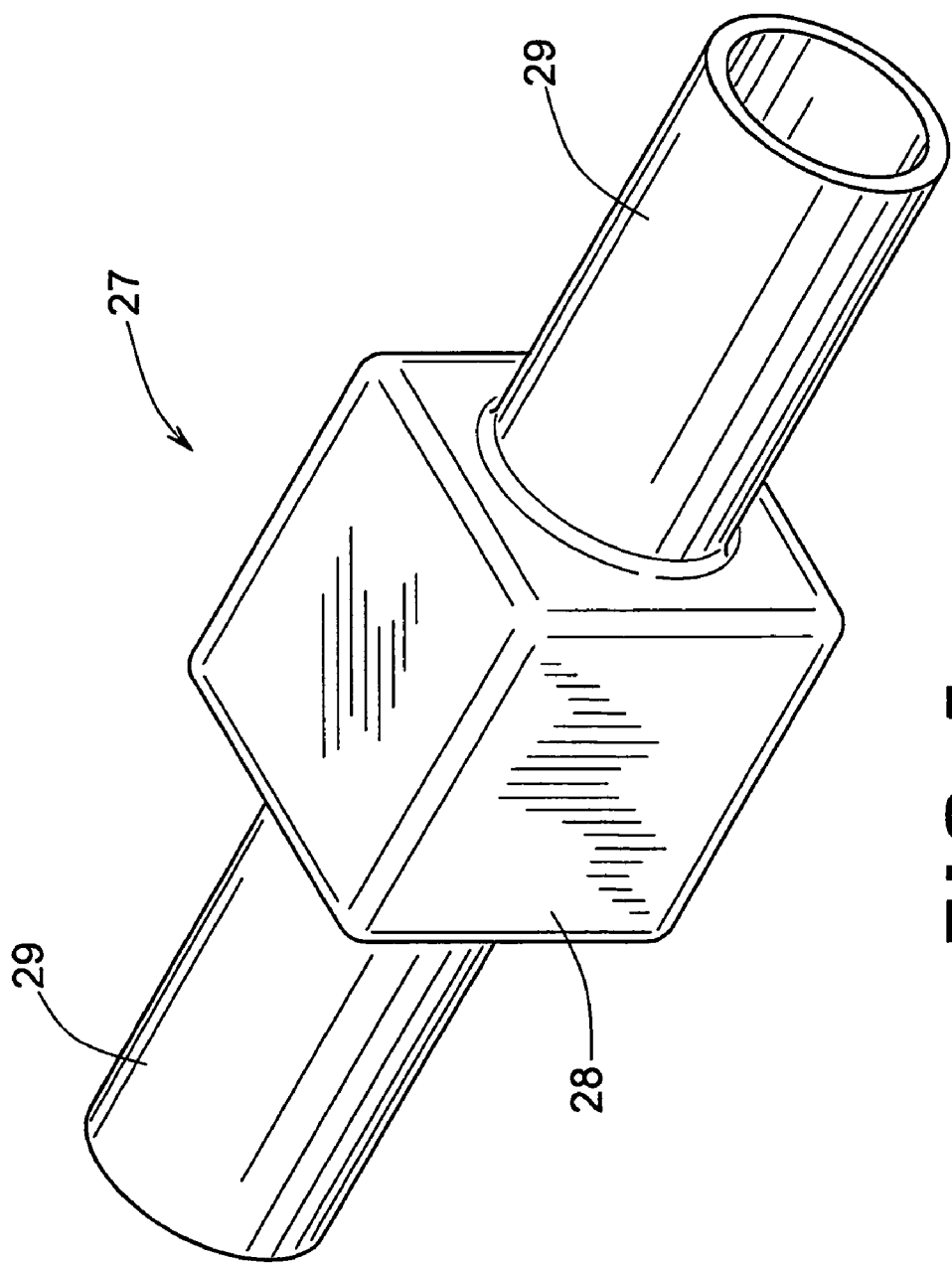
FIG. 5 is a perspective view of the formed tubular blank illustrated in FIG. 4.

FIGS. 2 through 7 illustrate a method of manufacturing a pair of the body mount support brackets in accordance with this invention. The body mount support brackets of this invention are preferably formed using a hydroforming operation. Hydroforming is a metal deformation process which, generally speaking, utilizes high pressure fluid introduced within a closed workpiece to expand portions of the workpiece outwardly into conformance with an enclosing die. Initially, as shown in FIGS. 2 through 5, the forming process begins by inserting a closed channel tubular blank 25 into a hydroforming die 26. The tubular blank 25 may be made from any suitable material and have any suitable wall thickness for forming the body mount support bracket of this invention. Typically, it is desirable that the tubular bland be formed from a relatively lightweight, strong, and metallic material, such as aluminum, magnesium, and the like. However, steel and other heavier metallic materials may be used as well. After the tubular blank 25 is disposed within the hydroforming die 26 as shown in FIGS. 2 and 3, highly pressurized fluid is introduced therein. As best shown in FIG. 4, the highly pressurized fluid within the tubular blank 25 causes portions thereof to expand outwardly into conformance with the enclosed hydroforming die 26. In the preferred embodiment, the hydroforming die 26 has a central portion of which is generally rectilinear in shape, for reasons that will become apparent below. However, it will be appreciated that the hydroforming die 26 may be of any suitable size and shape for forming the body mount support bracket. After the hydroforming operation has been completed, as shown in FIG. 5, the hydroformed blank, indicated generally at 27 is removed from the hydroforming die 26. The illustrated hydroformed blank 27 includes a generally rectilinear central portion 28 having a pair of arm portions 29 extending laterally therefrom.

Figure 6:
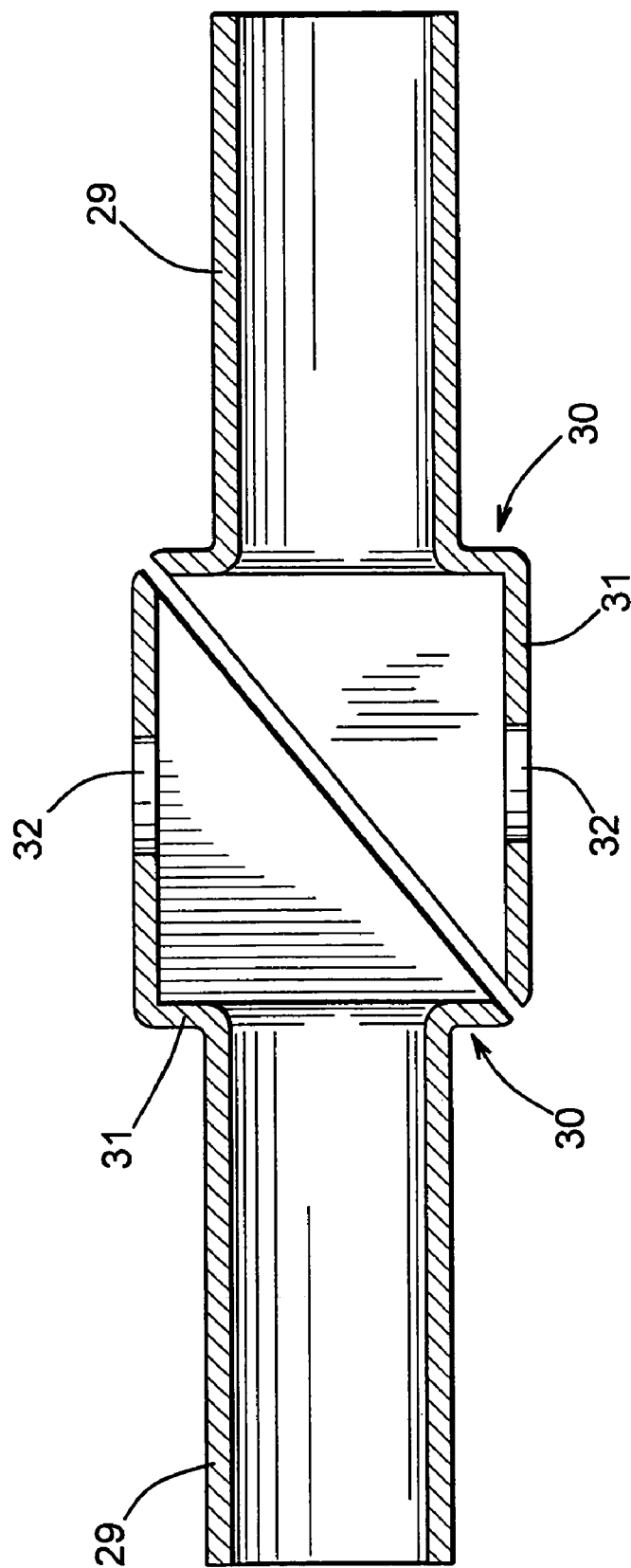
FIG. 6 is a sectional elevational view of the formed tubular blank illustrated in FIGS. 4 and 5 after being cut into two body mount support brackets.
Figure 7:
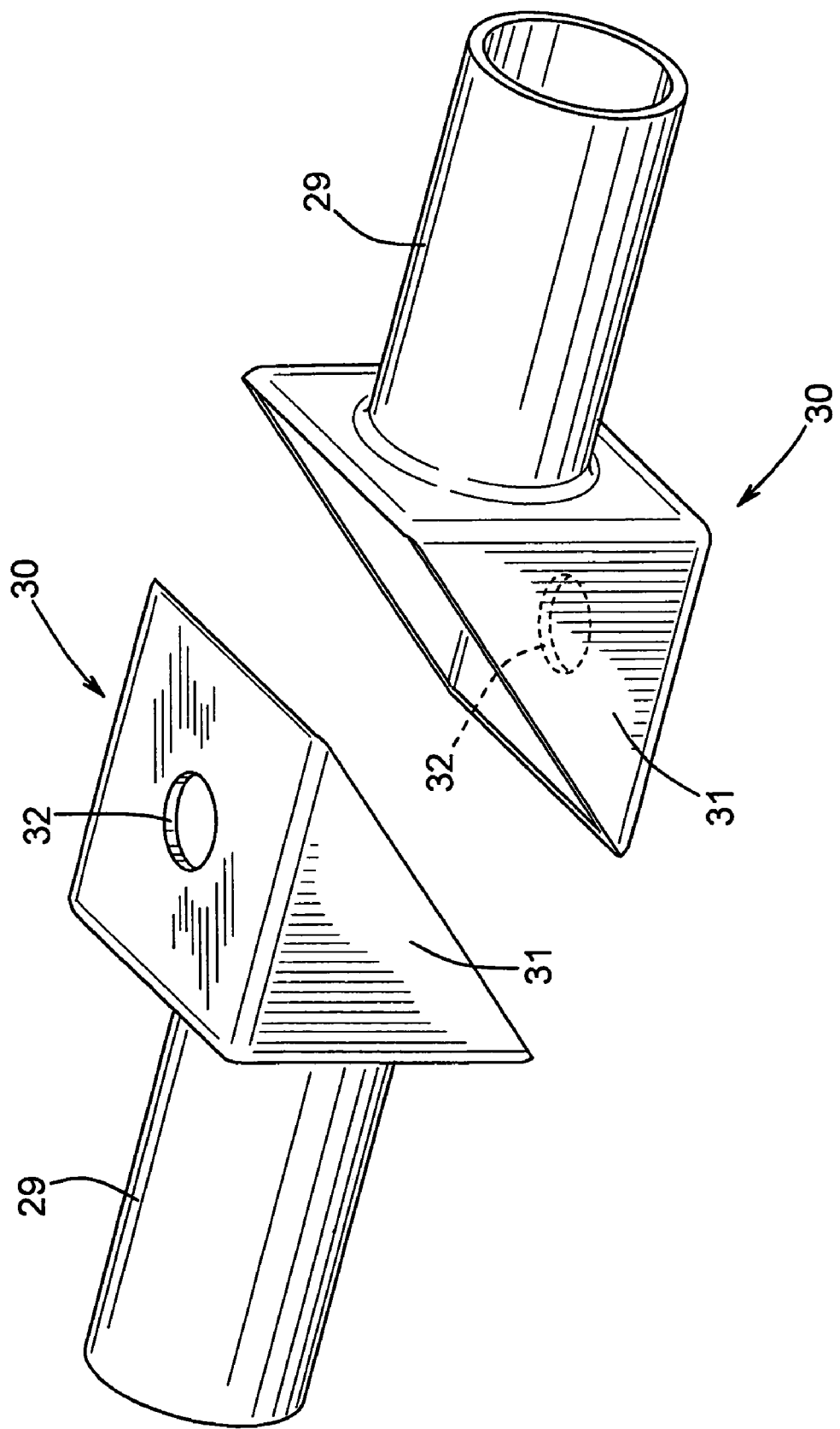
FIG. 7 is a perspective view of the two body mount support brackets illustrated in FIG. 6.

Following the initial hydroforming operation, the hydroformed blank 27 is then separated to form two identical body mount support brackets 30. This can be accomplished, for example, as shown in FIGS. 6 and 7, wherein the central portion 28 of the hydroformed blank 27 is cut diagonally, resulting in two identical body mount support brackets, each indicated generally at 30. It will appreciated, however, that the hydroformed blank 27 may also be cut or otherwise separated in any suitable manner for forming the two body mount support brackets 30. It will further be appreciated that the two body mount support brackets 30 need not be identical in shape. The hydroformed blank 27 may be cut using any suitable cutting operation.

Following the cutting operation, the finished structure of each of the body mount support brackets 30, best illustrated in FIG. 7, includes a central body portion 31 having an arm portion 29 extending therefrom. Additional finishing operations may also be performed on the individual body mount support brackets 30, either before or after the cutting operation. In a preferred embodiment, an opening 32 is formed through the body portion of each bracket 30. The openings 32 may be of any suitable size and shape to facilitate the connection of the frame assembly 10 to other components of the vehicle, such as the respective body mounts provided on the body portion of a vehicle body.

Figure 8:
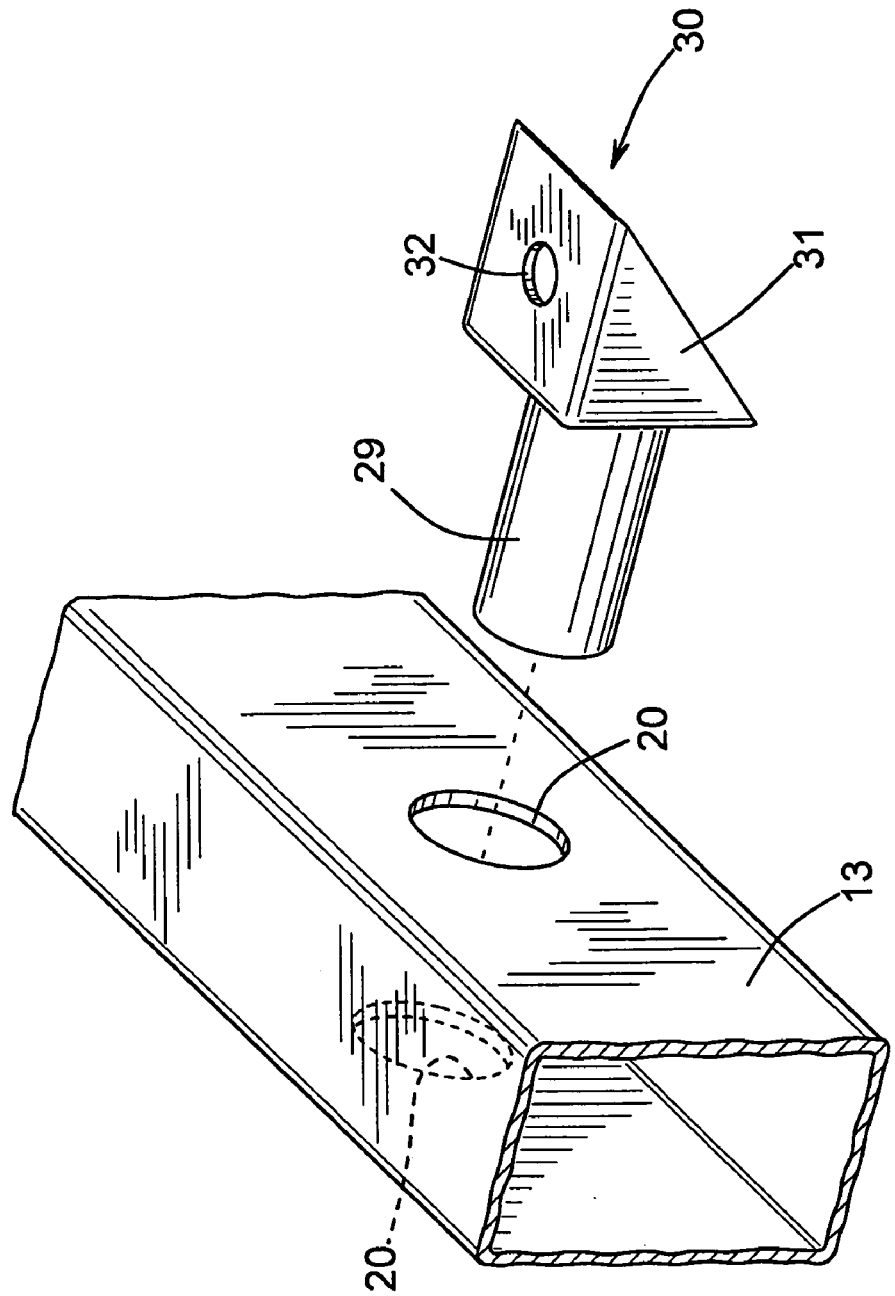
FIG. 8 is a perspective view of one of the body mount support brackets being assembled with a vehicle frame side rail section.

The body mount support bracket 30 is then attached to the side rail 13 of the frame assembly 10. Preferably, a magnetic pulse welding operation is used to attach the body mount support bracket 30 to the frame assembly 10. It will be appreciated, however, that any suitable joining operation may also be used to connect the body mount support bracket 30 to the frame assembly 10. As shown in FIG. 8, the arm portion 29 of the bracket 30 is aligned with the mounting hole 20 in the side rail 13. Then, as shown in FIG. 9, the arm portion 29 is inserted through the mounting hole 20 such that the opening 32 on the central body portion 31 of the bracket 30 is positioned relative to the side rail 13 so as to align with a corresponding point of attachment on the body assembly (not shown).

Figure 9:
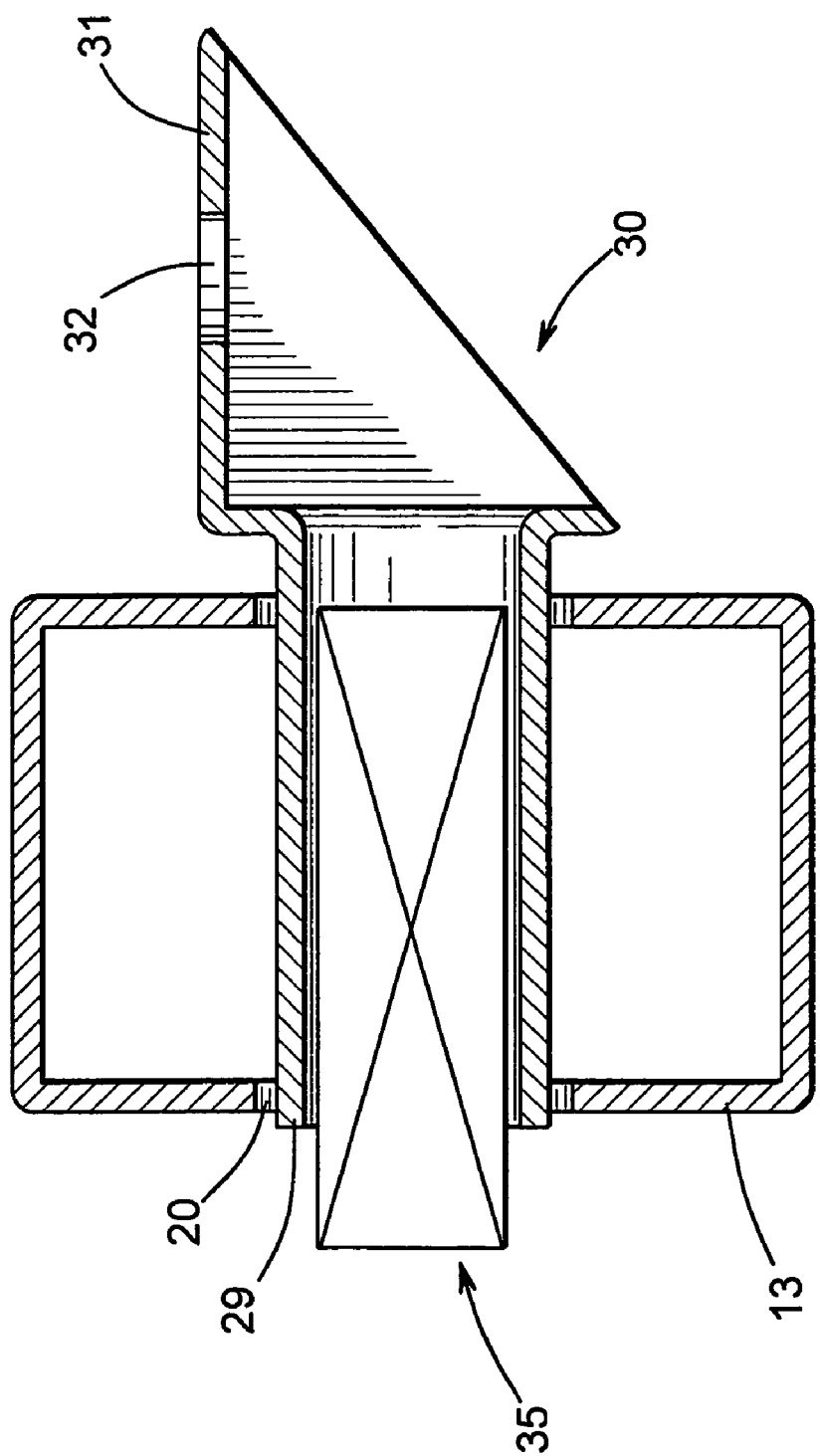
FIG. 9 is a sectional elevational view of the body mount support bracket assembled with the vehicle frame side rail section shown in FIG. 8, together with a magnetic pulse welding coil shown inserted within overlapping portions of the body mount support bracket and the vehicle side rail section prior to the magnetic pulse welding operation being performed.
Figure 10:
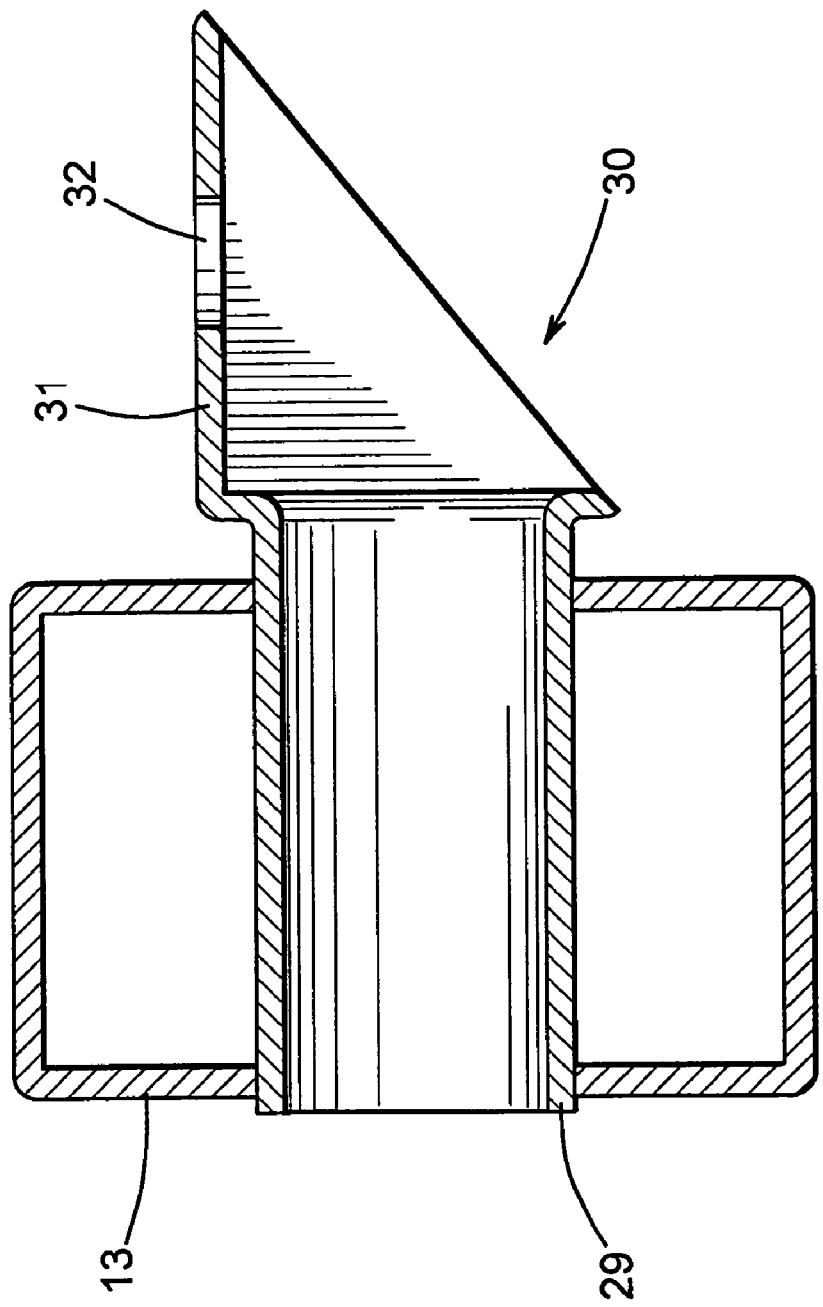
FIG. 10 is a sectional elevational view of the body mount support bracket and the vehicle side rail section illustrated in FIG. 9 shown after the magnetic pulse welding operation has been performed.
Figure 11:
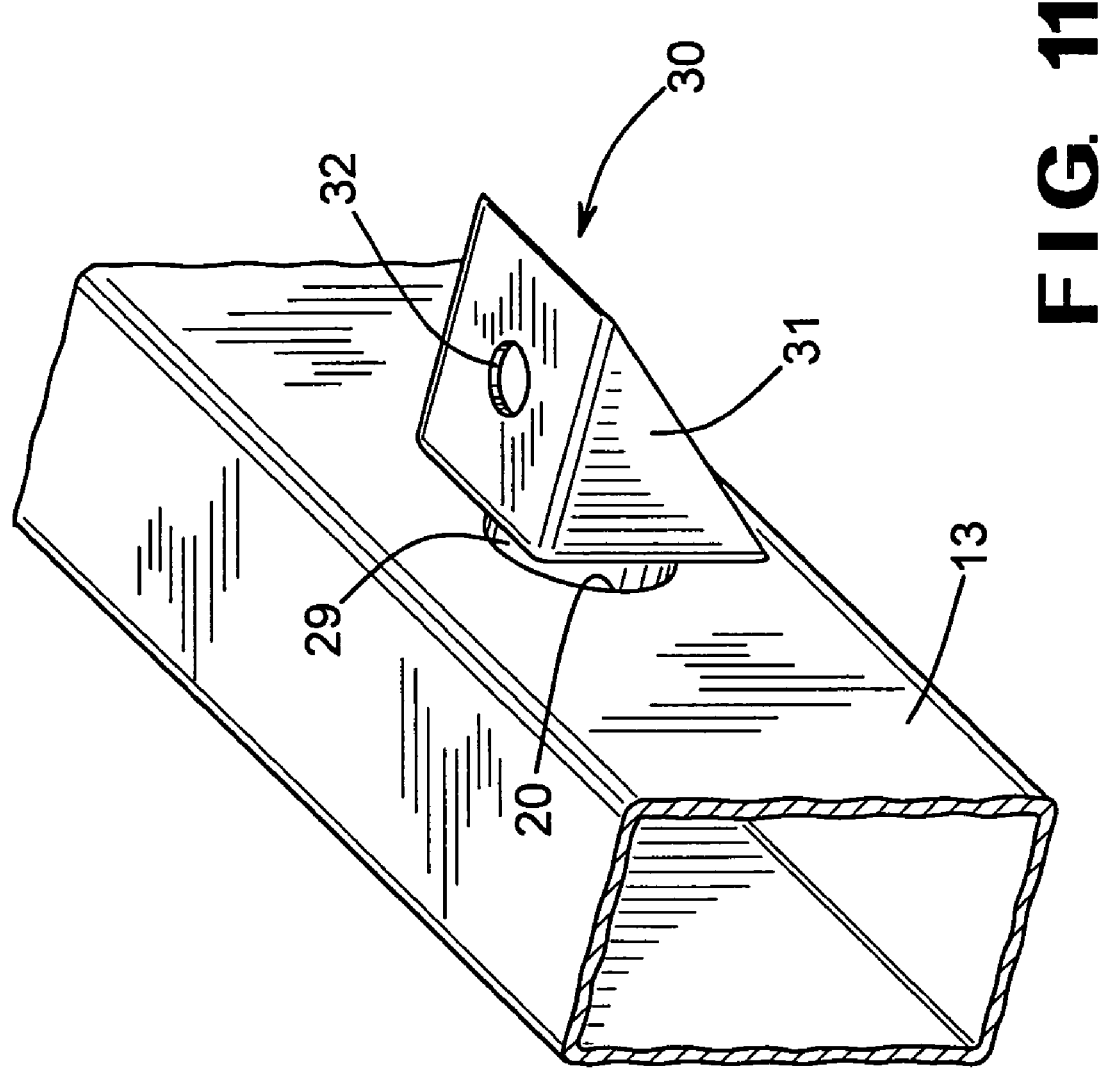
FIG. 11 is a perspective view of the body mount support bracket and the vehicle side rail section illustrated in FIG. 10.
Figure 12:
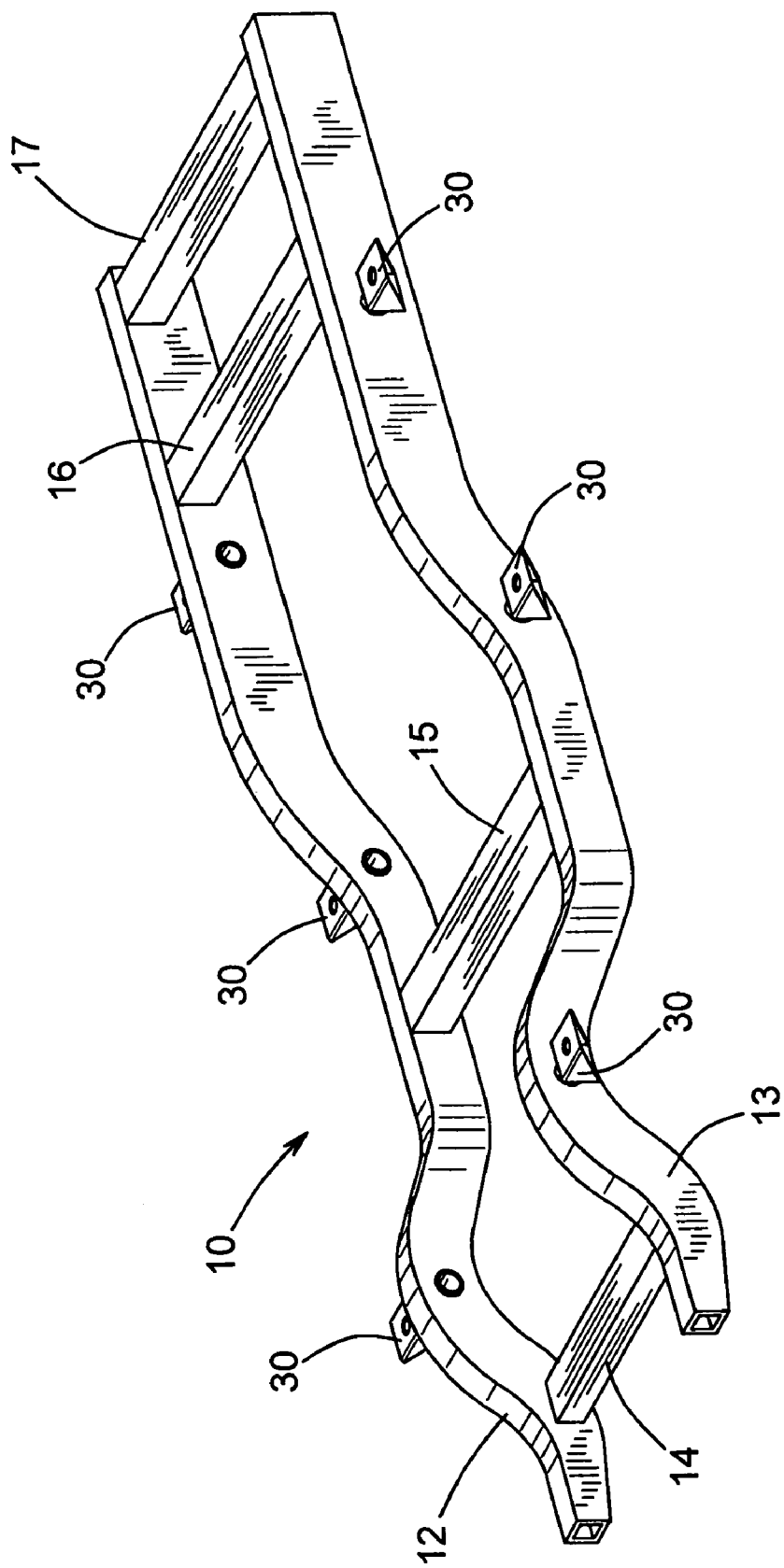
FIG. 12 is a perspective view of the ladder type frame assembly illustrated in FIG. 1 having a plurality of body mount support brackets welded thereto in accordance with the method of this invention.

As also shown in FIG. 9, an internal magnetic pulse welding inductor, indicated generally at 35, is provided to connect the arm portion 29 of the body mount support bracket 30 to the side rail 13. The magnetic pulse welding inductor assembly 35 is generally conventional in the art and includes an electromagnetic coil that is carried on a movable support. The coil is composed of a winding of an electrical conductor having leads and that extend therefrom through a switch to a source of electrical power. In a manner that is known in the art, when the switch is closed, a closed electrical circuit is formed through the leads and between the source of electrical power and the coil. As a result, electrical current flows through the coil, causing a magnetic field to be generated thereabout. The closing of the switch causes a magnetic field of relatively large intensity to be generated within the arm portion 29. This relatively large intensity magnetic field exerts a large pressure on the arm portion 29, causing it to expand outwardly toward the side rail 13 at a high velocity. The high velocity impact of these two components, as well as the large pressures exerted thereon, causes the two components to become permanently joined together. FIGS. 10 and 11 illustrate the bracket 30 following the magnetic pulse welding procedure where the arm portion 29 has expanded and bonded with the side rail 13. FIG. 12 then illustrates the above-described frame assembly 10 having a plurality of the body mount support brackets 30 attached thereto using the magnetic pulse welding procedure described herein.

In an alternate embodiment of this invention, wherein a flanged mounting hole 20 is provided, an external magnetic pulse forming apparatus may also be used. Where an external forming apparatus is used, the arm portion 29 of the support bracket 30 would be inserted into the mounting hole 20 such that an overlapping portion exists between the mounting hole 20 flange and the arm portion 29. A magnetic field is then generated by the external forming apparatus in the same manner as describe above, which causes the flange portion of the mounting hole 20 to deform inwardly into contact with the arm portion 29 of the support bracket 30.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A method of manufacturing a frame assembly comprising the steps of:
    (a) providing first and second brackets by (1) providing a closed channel structural member; (2) deforming the closed channel structural member to have a central body portion having a pair of arm portions extending therefrom; and (3) dividing the central body portion to provide first and second brackets, each including one of the arm portions;
    (b) providing a frame assembly including a component; and
    (c) securing the first and second brackets to the component.

2. The method defined in claim 1 wherein said step (a)(2) is performed by disposing the closed channel structural member within a die and hydroforming the closed channel structural member to have a central body portion having a pair of arm portions extending therefrom.

3. The method defined in claim 1 wherein said step (a)(3) is performed by cutting through the body portion.

4. The method defined in claim 1 wherein said step (a)(3) is performed by cutting through the body portion such that the first and second brackets are identical in shape.

5. The method defined in claim 1 wherein said step (c) is performed by magnetic pulse welding.

6. The method defined in claim 1 wherein said step (b) is performed by providing the component with first and second openings, and wherein said step (c) is performed by inserting the arm portions of the first and second brackets respectively in the first and second openings and securing the arm portions of the first and second brackets to the component by magnetic pulse welding.

7. A method of manufacturing first and second brackets comprising the steps of:
    (a) providing a closed channel structural member;
    (b) deforming the closed channel structural member to have a central body portion having a pair of arm portions extending therefrom;
    (c) diagonally dividing the central body portion to provide first and second brackets, each including one of the arm portions; and
    (d) securing the first and second brackets to a component.

8. The method defined in claim 7 wherein said step (b) is performed by disposing the closed channel structural member within a die and hydroforming the closed channel structural member to have a central body portion having a pair of arm portions extending therefrom.

9. The method defined in claim 7 wherein said step (c) is performed by cutting through the body portion.

10. The method defined in claim 7 wherein said step (c) is performed by cutting through the body portion such that the first and second brackets are identical in shape.

* * * * *